(12) United States Patent
Parnell

(10) Patent No.: US 10,391,725 B2
(45) Date of Patent: Aug. 27, 2019

(54) SUCKER ROD

(71) Applicant: Tevian Parnell, Big Spring, TX (US)

(72) Inventor: Tevian Parnell, Big Spring, TX (US)

( * ) Notice: Subject to any disclaimer, the term of this patent is extended or adjusted under 35 U.S.C. 154(b) by 66 days.

(21) Appl. No.: 15/914,017

(22) Filed: Mar. 7, 2018

(65) Prior Publication Data
US 2018/0194084 A1 Jul. 12, 2018

Related U.S. Application Data

(63) Continuation-in-part of application No. 15/214,207, filed on Jul. 19, 2016, now abandoned.

(51) Int. Cl.
| | |
|---|---|
| *B29C 70/52* | (2006.01) |
| *E21B 17/00* | (2006.01) |
| *E21B 43/12* | (2006.01) |
| *B29K 63/00* | (2006.01) |
| *B29K 105/10* | (2006.01) |
| *B29K 509/00* | (2006.01) |
| *B29K 105/16* | (2006.01) |
| *B29K 309/08* | (2006.01) |
| *B29K 477/00* | (2006.01) |

(52) U.S. Cl.
CPC ............ *B29C 70/525* (2013.01); *E21B 17/00* (2013.01); *B29K 2063/00* (2013.01); *B29K 2105/106* (2013.01); *B29K 2105/162* (2013.01); *B29K 2309/08* (2013.01); *B29K 2477/00* (2013.01); *B29K 2509/00* (2013.01); *E21B 43/126* (2013.01)

(58) Field of Classification Search
CPC .............................. B29C 70/52; E21B 17/00
USPC .......................................................... 524/31
See application file for complete search history.

(56) References Cited

U.S. PATENT DOCUMENTS

2007/0142547 A1* 6/2007 Vaidya ................ E21B 33/1208
524/847

* cited by examiner

*Primary Examiner* — Deve E Valdez
(74) *Attorney, Agent, or Firm* — Bruce A. Lev

(57) ABSTRACT

An improved sucker rod and the method of making is set forth herein. The improved sucker rod is used in well drilling to connect a pump present at a well casing to a motor and drive for a pump present at a well head. The method of making the improved sucker includes coating strands of sucker rod material with a mixture of epoxy and graphene platelets, bonding them together, and then extruding them through a pultrusion machine. The resulting improved sucker rod has increased flexibility, durability, corrosion resistance, and strength.

16 Claims, 8 Drawing Sheets

SUCKER ROD

CROSS-REFERENCE TO RELATED APPLICATION

The present application is related to and claims priority from prior provisional application Ser. No. 15/214,207, filed Jul. 19, 2016 which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of well drilling and more specifically relates to a sucker rod made from composite materials, i.e. graphene, carbon fiber, and fiberglass, to increase durability, corrosion resistance, strength, and flexibility.

2. Description of the Related Art

A sucker rod is an important component in well drilling for oil. The efficiency of oil production is highly dependent on the design of the sucker rod, and its proper installation and use. Failure of a sucker rod causes the entire system at an oil well to fail. Sucker rods are dynamic as they are in constantly accelerated motion. Two types of sucker rod are generally used, steel sucker rods and fiberglass sucker rods. Most common sucker rods are solid steel rods with two male fittings or with a male fitting and a female fitting at their ends.

At the oil well site, these sucker rods are connected, section by section via external coupling, if the sucker rods have two male fittings, or by inserting a male fitting inside a female fitting, in order to form a rod string of length sufficient to reach the entire length of the well casing. A pump is typically operated at the bottom of the well casing to force oil up the well casing to the well head, and from there to the oil tanks through underground pipes.

Hence sucker rods are typically assembled to form an operating rod connecting a pump, present at the well casing, to the power motor and drive for the pump present at the well head. The sucker rods have been known to suffer from one or more issues in the long term use in the operation at an oil well. The conventional steel rods are relatively heavy, with weights ranging from 1.5 to 3.5 lbs./ft. in commonly used sizes. The weight of steel rods is often 2-3 times the weight of the lifted fluid. Further, steel is vulnerable to corrosion, fatigue, and stress corrosion cracking. Fiberglass sucker rods are approximately a third the weight of steel, and have better corrosion resistance, but their modulus of elasticity is one fourth of steel, resulting in significant stretch. Many efforts have been made to improve the design of the sucker rod and their end fittings for improving their performance.

Various attempts have been made to solve the above-mentioned problems such as those found in U.S. Pat. No. 8,500,943 to Russell P. Rutledge Sr.; U.S. Pat. No. 4,452,314 to Earl M. Zion; and U.S. Pat. No. 4,662,774 to Fred E. Morrow Jr. This art is representative of drilling rig sucker rods. None of the above inventions and patents, taken either singly or in combination, is seen to describe the invention as claimed.

Ideally, a sucker rod should provide strength, flexibility and corrosion resistance and, yet would operate reliably and be manufactured at a modest expense. Thus, a need exists for a reliable composite sucker rod to avoid the above-mentioned problems.

BRIEF SUMMARY OF THE INVENTION

In view of the foregoing disadvantages inherent in the known sucker rod art, the present invention provides a novel composite sucker rod with increased strength, durability, flexibility, and corrosion resistance, with a reduction of loosening tendency in the rod connections. The general purpose of the present invention, which will be described subsequently in greater detail is to provide a composite sucker rod with increased strength, durability, and flexibility, with the ability to resist loosening at the rod joints.

A composite sucker rod is disclosed herein, in one embodiment the sucker rod comprises a hybrid composite material having a graphene material and at least one reinforcing agent and a binder. The reinforcing agent can be fiberglass, carbon fiber, cellulosic fibers, or a combination thereof. The binder can be epoxy, vinyl ester, polyester, polyurethane, polypropylene, or a combination thereof, and is formed as epoxy resin.

The graphene material is formed from graphene oxide nanosheets and functionalized graphene; and the reinforcing agent is formed from one-dimensional nano-fibrillated cellulose fibers and linear acetylenic carbon and fiberglass. The composite sucker rod may be formed having an inner layer of fiberglass reinforced composite material, and an outer graphene reinforced layer adhered to the inner layer using a resin.

The composite sucker rod may include an end fitting of hybrid composite material having a graphene material, at least one reinforcing agent, and a binder. The reinforcing agent can be fiberglass, carbon fiber, cellulosic fibers, or a combination thereof, and formed from one-dimensional nano-fibrillated cellulose fibers. The binder can be epoxy, vinyl ester, polyester, polyurethane, polypropylene, or a combination thereof, and formed from an epoxy resin mixed with graphene oxide nanosheets.

The method of making the preferred embodiment of the improved sucker includes coating strands of sucker rod material with a mixture of epoxy and graphene platelets, bonding them together, and then extruding them through a pultrusion machine. The resulting improved sucker rod has increased flexibility, durability, corrosion resistance, and strength The present invention holds significant improvements and serves as a composite sucker rod. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

As discussed above, embodiments of the present invention relate to a sucker rod and more particularly to a composite sucker rod as used to improve the ability of users to create a more flexible, durable, and corrosion resistant operating rod, and reduce breakage and down time.

Generally speaking, a composite sucker rod is used in well drilling to connect a pump present at the well casing to the motor and drive for the pump, present at the well head. Sucker rods via the end fittings are assembled section by section by a coupling, or through male/female threaded fittings to form a rod string long enough to reach the entire length of the well casing.

In one embodiment, the improved composite sucker rod can have an inner steel core and include an outer layer of hybrid composite material formed from graphene material and at least one reinforcing agent selected from a list of reinforcing agents consisting of fiberglass, carbon fiber, cellulosic fibers, or a combination thereof, and a binder. The binder can be a plastic resin selected from a list of plastic resins consisting of epoxy, vinyl ester, polyester, polyurethane, polypropylene, or a combination thereof, and is formed as epoxy resin. It further has a specialized flank to flank contact threading system to reduce loosening at the rod joints.

Figure 1:
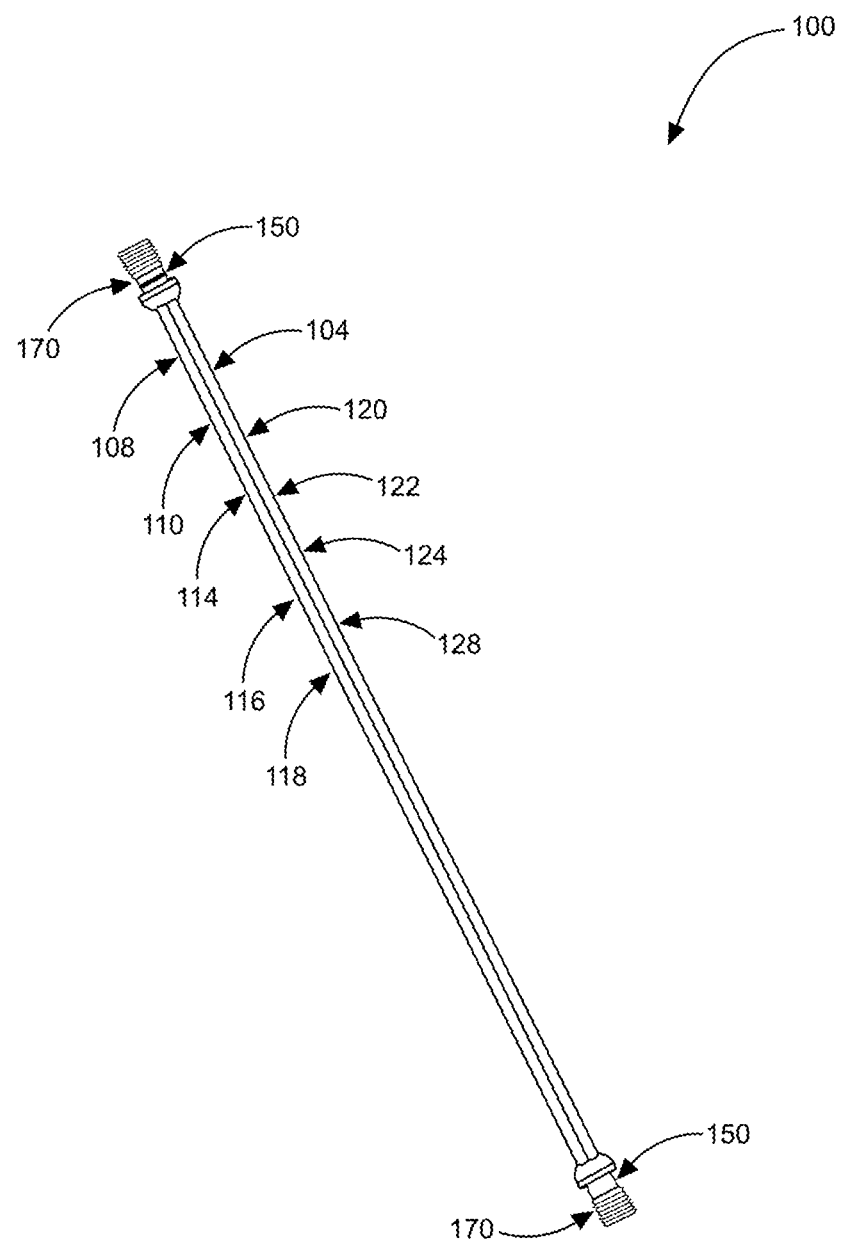
FIG. 1 shows a side view illustrating the sucker rod according to an embodiment of the present invention.

Referring to the drawings by numerals of reference there is shown in FIG. 1, a perspective view illustrating a composite sucker rod 100 according to one embodiment of the present invention.

Composite sucker rod 100 is disclosed herein, in a preferred embodiment comprising: hybrid composite material 104 having graphene material 108 including platelets, at least one reinforcing agent 114 and binder 120. Composite sucker rod 100 has at least one reinforcing agent 114 being selected from a list of reinforcing agents consisting of fiberglass, carbon fiber, cellulosic fibers, or a combination thereof. Binder 122 is plastic resin 124 selected from a list of plastic resins consisting of epoxy, vinyl ester, polyester, polyurethane, polypropylene, or a combination thereof, and is formed as epoxy resin 128.

Figure 2:
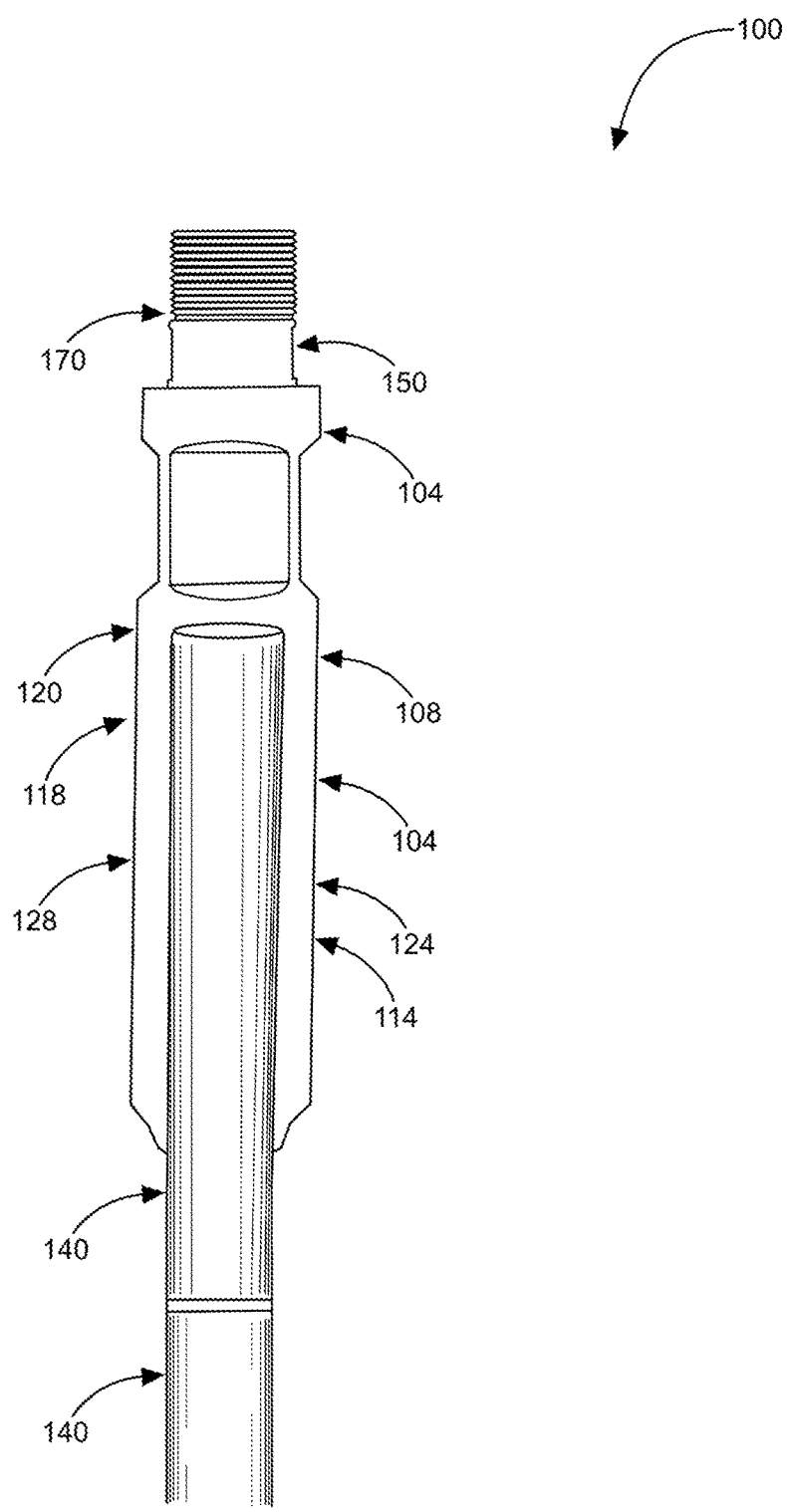
FIG. 2 is a cut away view illustrating the sucker rod according to an embodiment of the present invention of FIG. 1.

Referring now to FIG. 2, a cut away view illustrating the composite sucker rod 100 according to one embodiment of the present invention is shown.

Composite sucker rod 100 has an inner core of steel 140 and includes an outer layer of hybrid composite material 104. Graphene material 108 is formed from graphene oxide nanosheets 110 and functionalized graphene; and reinforcing agent 114 is formed from one-dimensional nano-fibrillated cellulose fibers 116 and linear acetylenic carbon 118 and fiberglass. Composite sucker rod 100 further comprises an inner layer of fiberglass reinforced composite material 120, and an outer graphene reinforced layer 108 adhered to the inner layer using resin 128.

Figure 3:
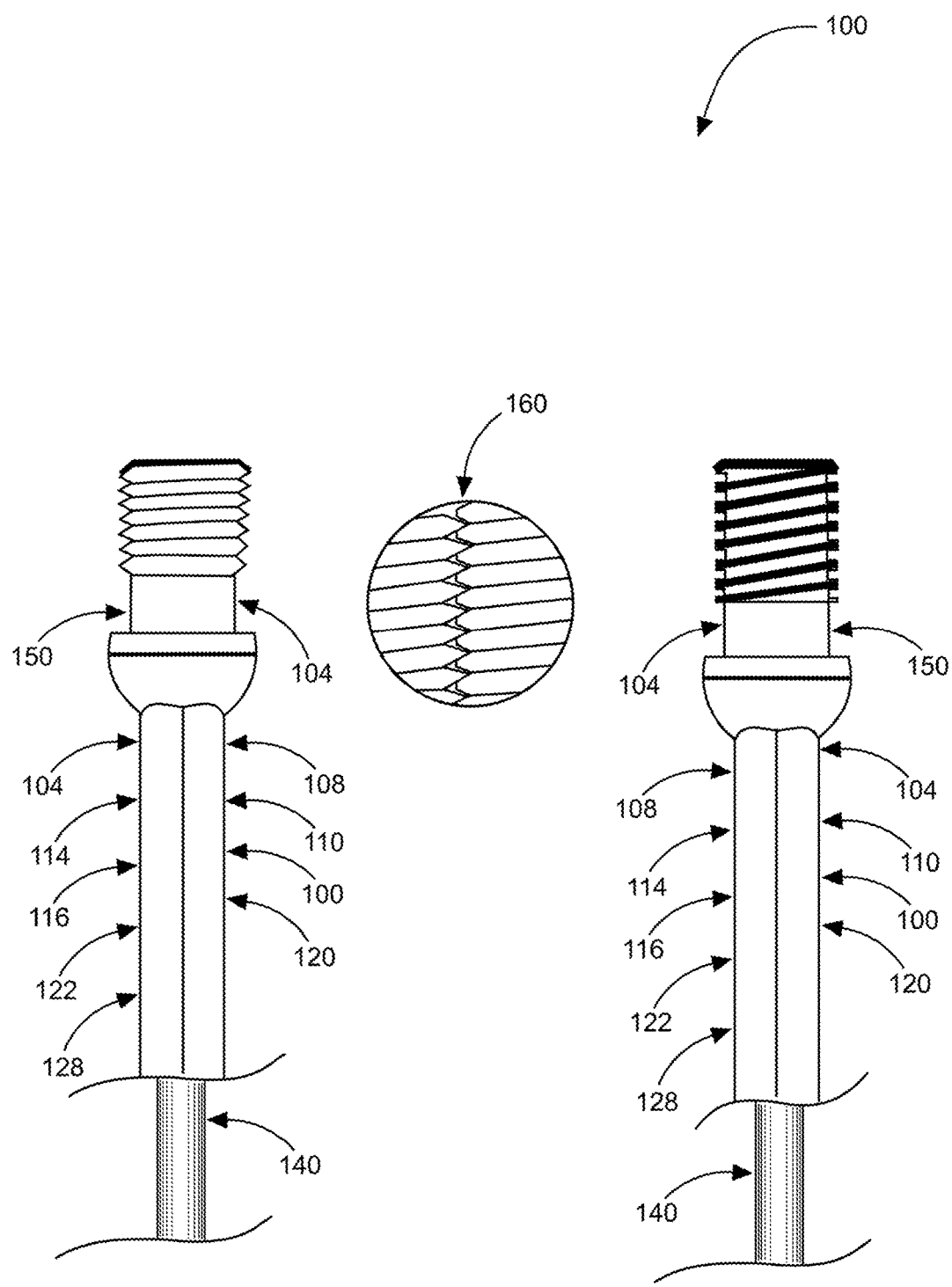
FIG. 3 is a side view illustrating the sucker rod end fittings according to an embodiment of the present invention of FIG. 1.

Referring now to FIG. 3, a perspective view illustrating the composite sucker rod 100 end fittings 150 according to one embodiment of the present invention is shown.

Composite sucker rod 100 further comprises end fitting 150 having hybrid composite material 104 having graphene material 108, at least one reinforcing agent 114, and binder 122. Reinforcing agent 114 is selected from a list of reinforcing agents 114 consisting of fiberglass, carbon fiber, cellulosic fibers, or a combination thereof, and is formed from one-dimensional nano-fibrillated cellulose fibers 116. Binder 122 is plastic resin 124 selected from a list of plastic resins 124 consisting of epoxy, vinyl ester, polyester, polyurethane, polypropylene, or a combination thereof, and is formed from an epoxy resin 128 mixed with graphene oxide nanosheets 110. It further has a specialized flank to flank contact 160 threading system to reduce loosening at rod joints 170.

Composite sucker rod 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., or arrangements such as, for example, including more or less components, customized parts, different color combinations, parts may be sold separately, etc., may be sufficient.

Figure 4:
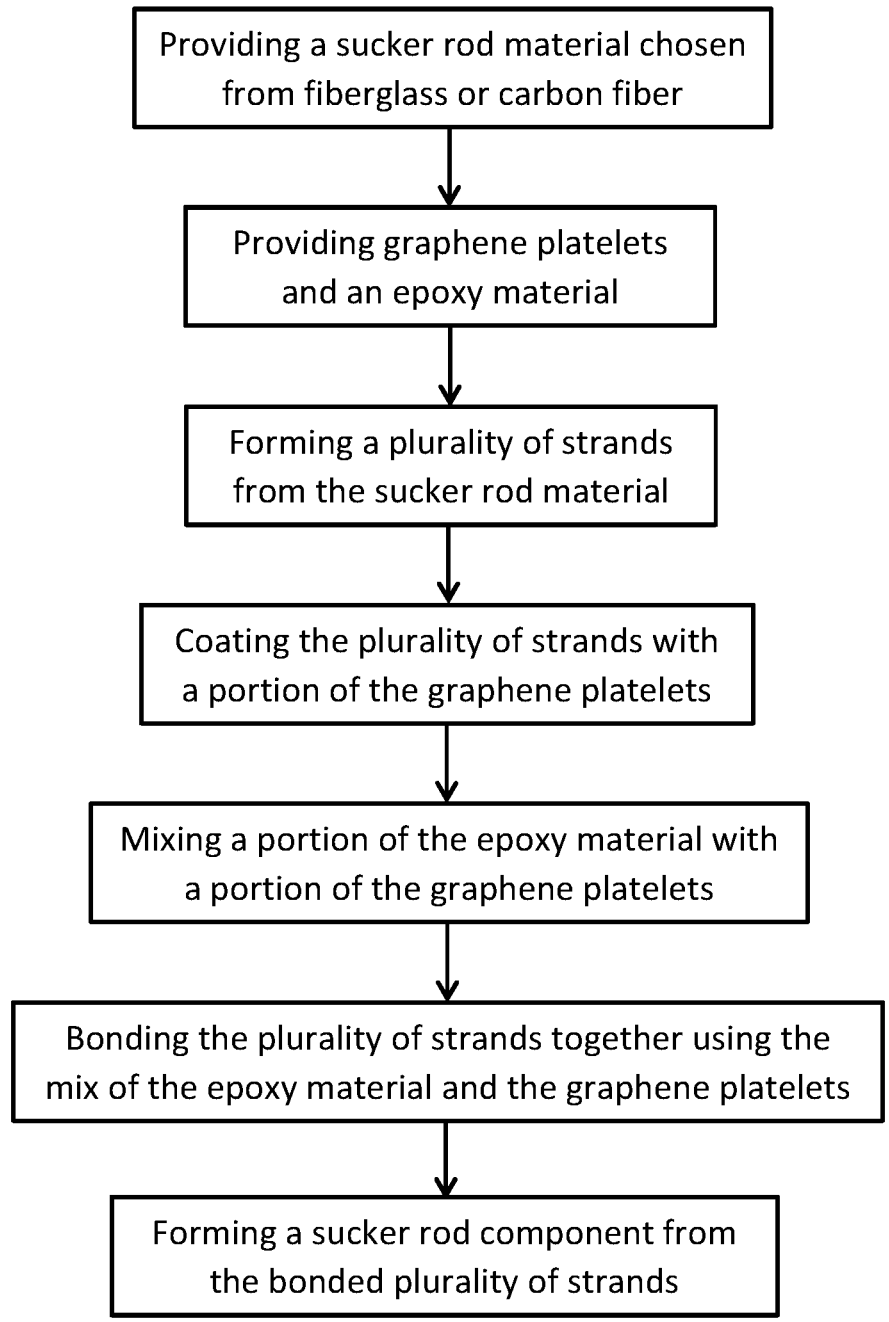
FIG. 4 shows a flowchart of the method steps necessary for forming the sucker rods.

Referring now to FIG. 4, the method of making a preferred embodiment of the sucker rod is shown in a flowchart comprising the steps of providing a sucker rod material chosen from fiberglass or carbon fiber; providing graphene platelets; providing an epoxy material; forming a plurality of strands from the sucker rod material; coating the plurality of strands with a portion of the graphene platelets; mixing a portion of the epoxy material with a portion of the graphene platelets; bonding the plurality of strands together using said mix of the epoxy material and the graphene platelets; and then forming a sucker rod component from the bonded plurality of strands.

Figure 5:
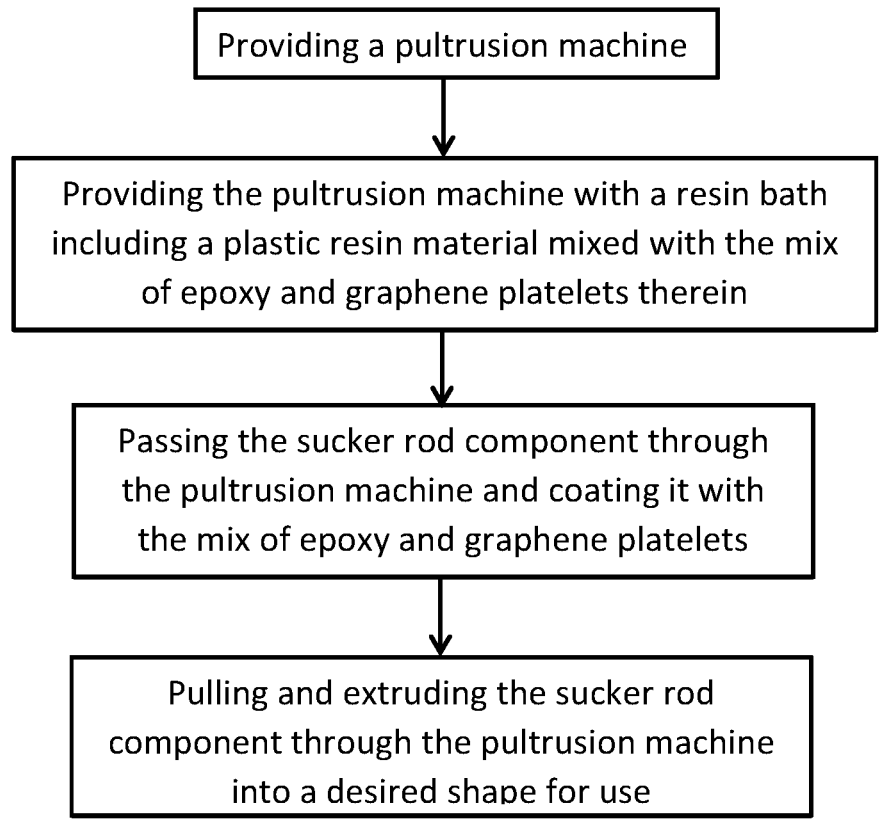
FIG. 5 shows a flowchart of the method steps necessary for providing the machine used to form the sucker rods.

Referring now to FIG. 5, the method of making the preferred embodiment of the sucker rod is shown including the steps of providing a pultrusion machine 300 including a resin bath 310 including a plastic resin material mixed with the mix of the epoxy and the graphene platelets therein; and passing the sucker rod material through the pultrusion machine, such that the sucker rod material is coated with the mix of epoxy and graphene platelets, bonded together, and then pulled and extruded therethrough into a desired shape for use.

Figure 6:
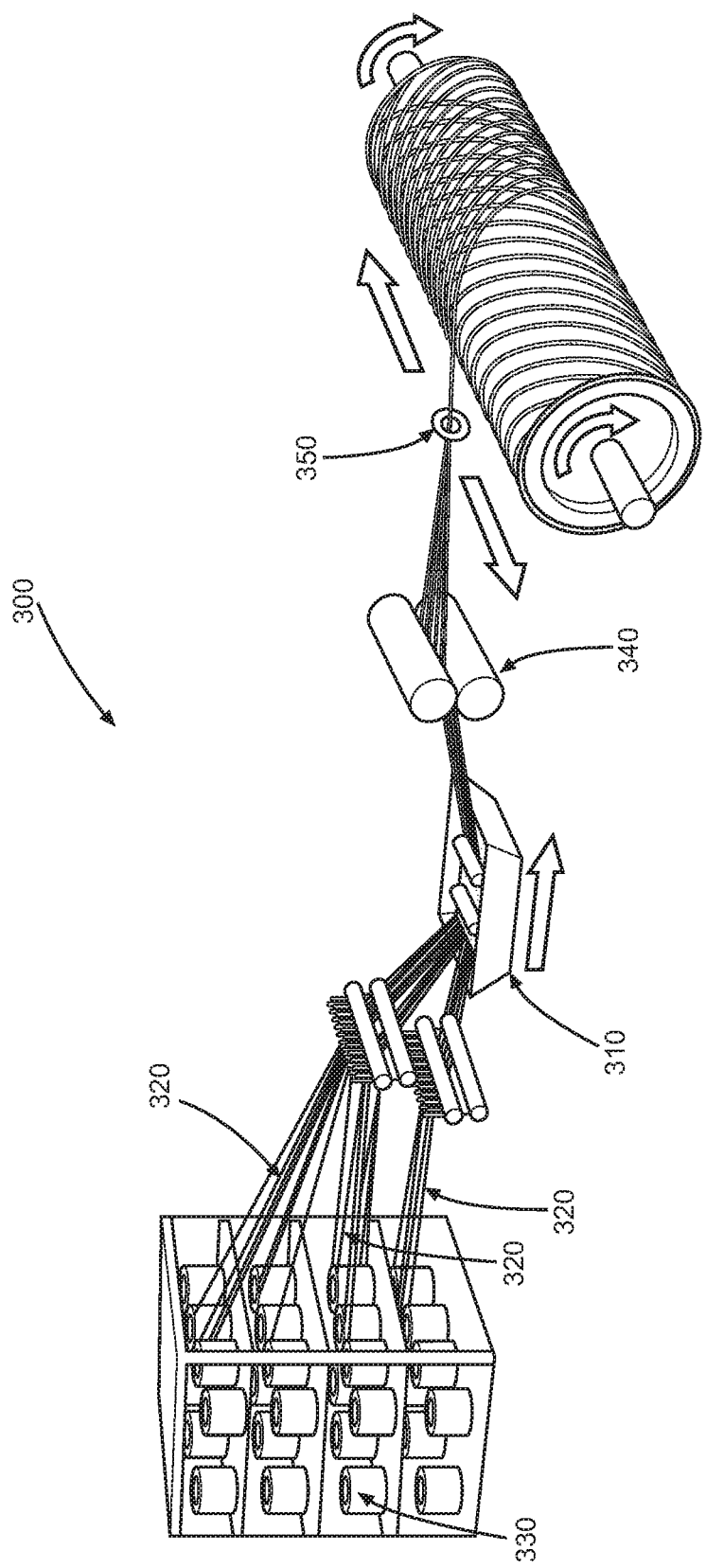
FIG. 6 is a perspective view of a pultrusion machine used to form the sucker rods including a resin bath.
Figure 7:
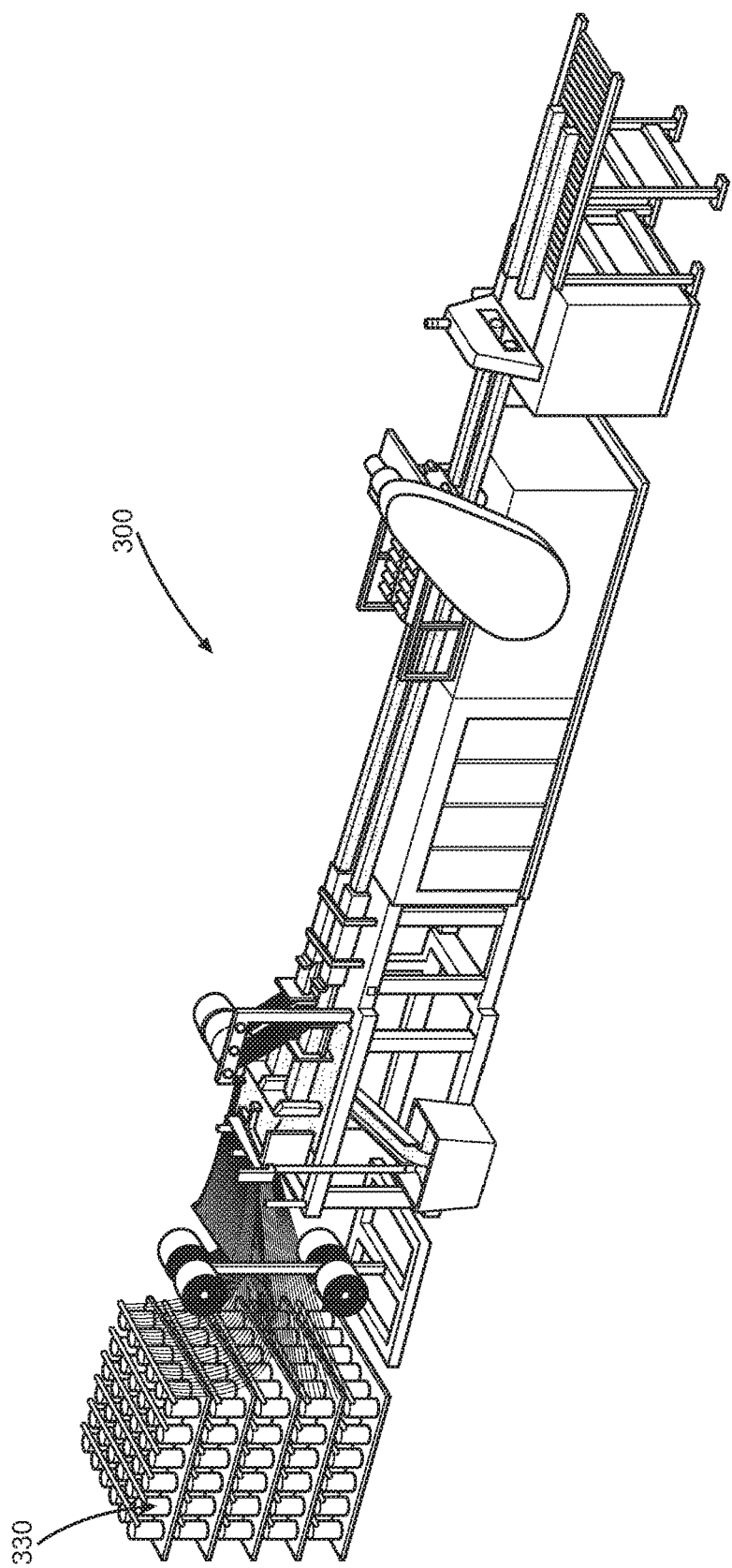
FIG. 7 is a perspective view of a pultrusion machine used to form the sucker rods including a spray mechanism.
Figure 8:
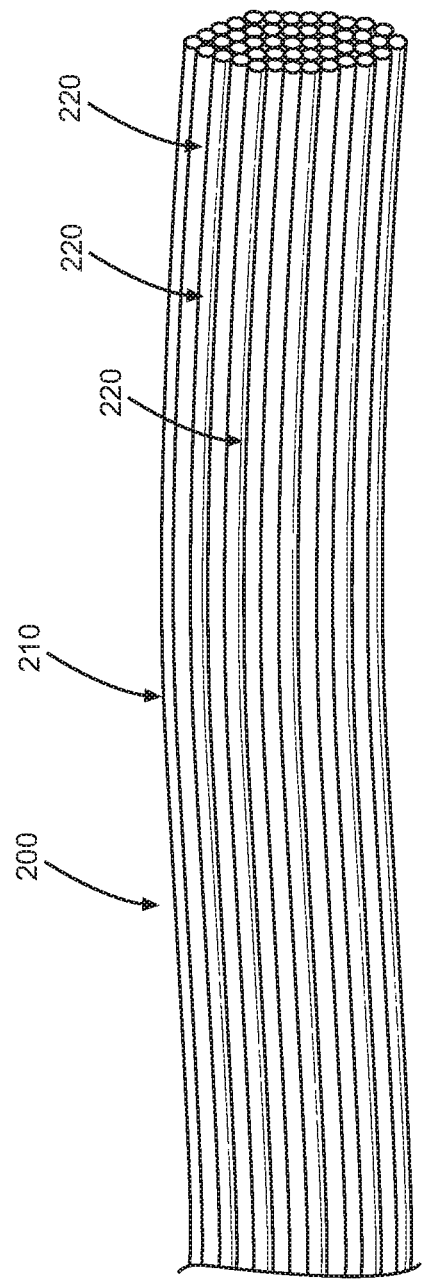
FIG. 8 shows a perspective view of the sucker rod component formed as a solid laminate material.

Referring now to FIGS. 6-8, a sucker rod component 200 of the preferred embodiment is formed from a plurality of strands 320 of sucker rod material coated with a mix of epoxy and graphene platelets bonded together to form a laminate material. The graphene platelets can be mixed in acetone via sonication before being coated onto the plurality of strands. The acetone may be chosen from a group of acetones consisting of a lubricant and a binder. The step of coating said plurality of strands with graphene platelets includes the steps of providing a mechanism that sprays or dips the strands 320 and uses the mechanism to apply the graphene platelets upon the strands. The graphene platelets can be used via a synthetic process using ethanol.

The plastic resin material may be epoxy, vinyl ester, polyester, polyurethane, polypropylene, and any combination thereof. The laminate material can be formed from fiberglass. The laminate material can be formed from a carbon fiber composite material.

The step of mixing a portion of said epoxy material with a portion of said graphene platelets may further include mixing in a filler material to said mix of said epoxy material and said graphene platelets, such that when bonding said plurality of strands together using said mix of said epoxy material, said graphene platelets, and said filler material desired material characteristics are achieved. The filler material may formed from nanoparticles, nylon, nanoclay, or organoclay.

In further discussion of the method of forming the strands using the pultrusion machine 300, and referring to FIGS. 6 and 7, individual strands are spread out like a ribbon over roller members 330. The width of each ribbon is determined by the strand count in the roving. The ribbon is then run through the dip bath 310 containing graphene platelets in dispersion of a lubricant or a binder to coat the ribbon. The ribbon then exits through a nip rollers 340 to consolidate the dispersion into the ribbon like a squeegee and also to push excess materials back into the bath. The ribbon is then run through a narrow die 350 to essentially bring all of the strands back together. This is the same method as for spray coating. The only difference is the spray method doesn't need a bath. Only the dip method needs a bath.

It is to be understood that the above description is intended to be illustrative, and not restrictive. For example, the above discussed embodiments may be used in combination with each other. Many other embodiments will be apparent to those of skill in the art upon reviewing the above description.

Whereas, the construction and method have been described in relation to the figures of the drawings, it should be understood that other and further modifications, apart from those shown or suggested herein, may be made within the spirit and scope of this invention.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed:

1. A method of making a sucker rod component comprising the steps of:
   providing a sucker rod material;
      wherein said chosen sucker rod material is chosen from a list of sucker rod materials consisting of fiberglass and carbon fiber;
   providing graphene platelets;
   providing an epoxy material;
   forming a plurality of strands from said sucker rod material;
   coating said plurality of strands with a portion of said graphene platelets;
   mixing a portion of said epoxy material with a portion of said graphene platelets;
   bonding said plurality of strands together using said mix of said epoxy material and said graphene platelets; and
   forming said sucker rod component from said bonded plurality of strands.

2. The method of making a sucker rod component of claim 1, wherein said step of forming said sucker rod component includes the steps of:
   providing a pultrusion machine including:
      a resin bath;
         wherein said resin bath includes a plastic resin material mixed with a mix of said epoxy and said graphene platelets therein; and
      passing said sucker rod component through said pultrusion machine, such that said sucker rod component is coated with said mix of epoxy and graphene platelets, and pulling and extruding therethrough into a desired shape for use.

3. The method of making a sucker rod component of claim 1, wherein said sucker rod component is formed as a solid laminate material.

4. The method of making a sucker rod component of claim 3, wherein each layer of said laminate material is coated with said mix of epoxy and graphene platelets, such that said mix of epoxy and graphene platelets are coated between each said layer of said laminate material.

5. The method of making a sucker rod component of claim 1, wherein said graphene platelets are mixed in acetone via sonication before being coated onto said plurality of strands.

6. The method of making a sucker rod component of claim 1, wherein said step of coating said plurality of strands with graphene platelets includes the steps of:
   providing a mechanism chosen from a list of mechanisms consisting of spraying and dipping; and using said mechanism to apply said graphene platelets upon said sucker rod material.

7. The method of making a sucker rod component of claim 1, wherein said graphene platelets are used via a synthetic process using ethanol.

8. The method of making sucker rod components of claim 2, wherein said plastic resin material is selected from a list of plastic resin materials consisting of epoxy, vinyl ester, polyester, polyurethane, polypropylene, and any combination thereof.

9. The method of making sucker rod components of claim 3, wherein said laminate material is formed from fiberglass.

10. The method of making sucker rod components of claim 3, wherein said laminate material is formed from a carbon fiber composite material.

11. The method of making a sucker rod component of claim 5, wherein said acetone is chosen from a group of acetones consisting of a lubricant and a binder.

12. The method of making a sucker rod component of claim 1, wherein said step of mixing a portion of said epoxy material with a portion of said graphene platelets further includes mixing in a filler material to said mix of said epoxy material and said graphene platelets, such that when bonding said plurality of strands together using said mix of said epoxy material, said graphene platelets, and said filler material desired material characteristics are achieved.

13. The method of making a sucker rod component of claim 12, wherein said filler material is formed from nanoparticles.

14. The method of making a sucker rod component of claim 12, wherein said filler material is nylon.

15. The method of making a sucker rod component of claim 13, wherein said filler material is nanoclay.

16. The method of making a sucker rod component of claim 12, wherein said filler material is organoclay.

* * * * *